J. C. CROWSON.
NUT LOCK.
APPLICATION FILED DEC. 28, 1908.
921,805.
Patented May 18, 1909.
2 SHEETS—SHEET 1.
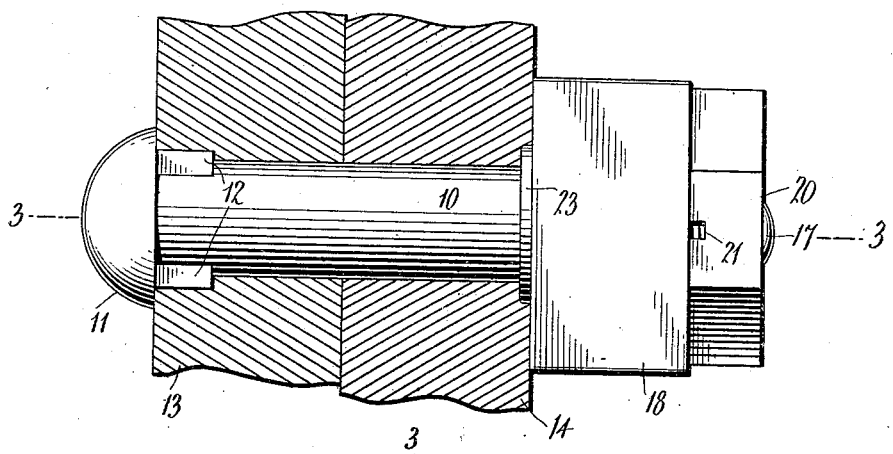
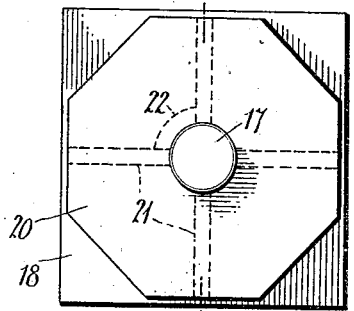
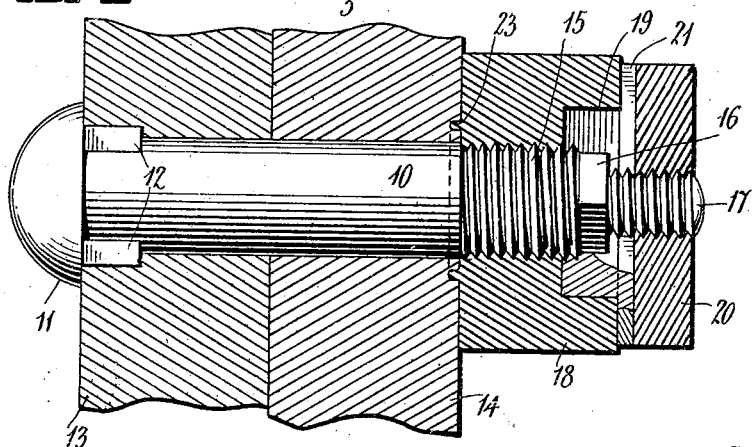
Witnesses
Inventor
John C. Crowson J. C. CROWSON.
NUT LOCK.
APPLICATION FILED DEC. 28, 1908.
921,805.
Patented May 18, 1909.
2 SHEETS—SHEET 2.
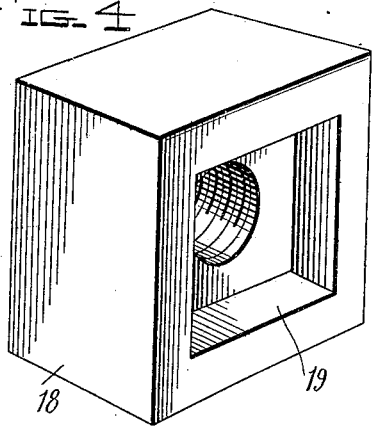
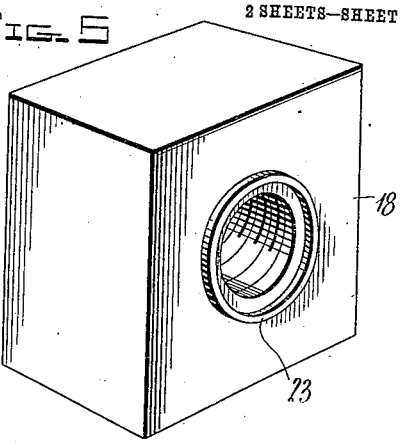
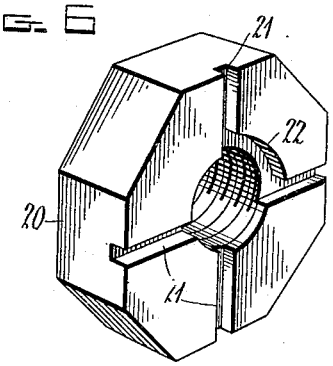
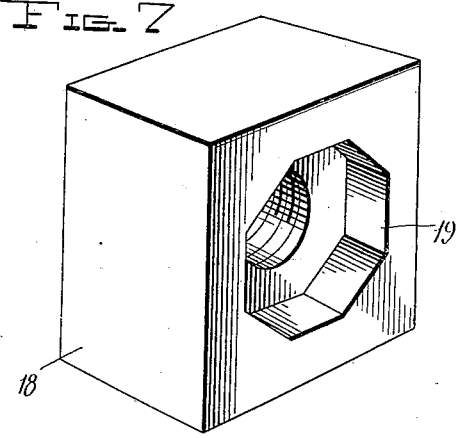
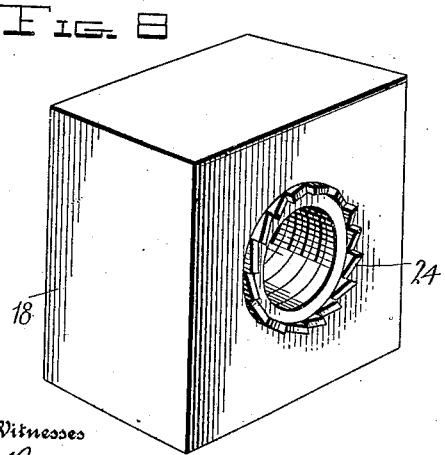
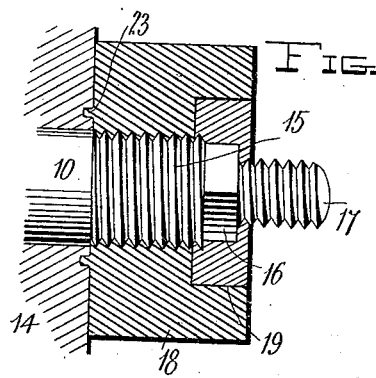
Witnesses
Inventor
John C. Crowson
By 
Attorneys

UNITED STATES PATENT OFFICE.

JOHN C. CROWSON, OF PENSACOLA, FLORIDA.

NUT-LOCK.

No. 921,805.　　　　Specification of Letters Patent.　　　　Patented May 18, 1909.

Application filed December 28, 1908. Serial No. 469,523.

*To all whom it may concern:*

Be it known that I, JOHN C. CROWSON, a citizen of the United States, residing at Pensacola, in the county of Escambia, State of Florida, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for one of its objects to provide a simply constructed device of this character whereby a nut is prevented from becoming loose upon the bolt or turning backward thereon.

With this and other objects in view the invention consists in certain novel features of construction as hereafter shown and described and then specifically pointed out in the claims.

The improved device may be applied to bolts of various kinds and to bolts employed for various purposes, but is more particularly applicable to bolts for securing two bodies together with the bolt in a horizontal position, but it will be understood that the invention is not necessarily limited to bolts arranged horizontally, and it is not desired therefore to limit the invention to bolts arranged in this manner. For the purpose of illustration however, a bolt is shown arranged horizontally and operating to clamp two bodies together, and in the drawings thus employed, Figure 1 is a side elevation of the bolt and its improved nuts with the body which is clamped by the bolt in section. Fig. 2 is an end view of the bolt and its nuts. Fig. 3 is a section on the line 3—3 of Fig. 1. Fig. 4 is a perspective view of the main nut from the outside. Fig. 5 is a perspective view of the main nut from the inside. Fig. 6 is a perspective view of the jam nut from the inside. Fig. 7 is a perspective view of a modified form of the main nut from the outside. Fig. 8 is a perspective view of a modified form of the main nut from the inside. Fig. 9 is a sectional detail illustrating a modification in the construction.

The bolt comprises a body portion 10 having a head 11 of any suitable form, and when employed in clamping wooden bodies will be provided with holding fins or protuberances 12 to prevent the rotation of the bolt. Two bodies are represented at 13—14 through which the bolt extends.

The bolt 10 is formed with a threaded portion 15, a reduced portion 16 at the outer terminal of the threaded portion 15 and with a reduced threaded portion 17 in advance of the reduced portion 16, the reduced portion 16 being preferably square or in other form than round, the object to be hereafter explained.

Engaging the threaded portion 15 is a main nut 18, the latter provided with a cavity or recess 19 in its outer face, the depth of the cavity being sufficient to cause one or more of the threads of the threaded portion 15 of the bolt to extend into the cavity or recess when the nut is turned "home" against the bodies 14—13, as shown in Fig. 3. The reduced portion 16 is thus wholly within the recess 19, while the reduced threaded portion 17 extends beyond the outer face of the nut 18 in position to receive a jam nut 20. The jam nut is formed with a plurality of radially arranged grooves 21 in its inner face. Any number of the grooves may be employed, but for the purpose of illustration four of the grooves are shown. The material of the nut is cut away as shown at 22 between two of the grooves to provide communication between the same, the object to be hereafter explained. The main nut 18 may be of any external form, but for the purpose of illustration is shown square, and the jam nut is shown with eight sides to reduce the weight. Formed upon the inner face of the nut is an annular rib 23, designed to bite into the body 14, and thus increase the holding power of the nut. The rib 23 may be a continuous circle as shown in Fig. 5, or in the form of ratchets as shown in Fig. 8 at 24.

In applying the improved device the bolt 10 is located through the bodies 13—14 and the nut 18 applied and turned home in the ordinary manner by a wrench or other implement, this operation causing the rib 23 to enter the body 14, when the latter is of relatively soft material, such as wood, and to bear with greater force upon the body when the latter is of metal. The rib thus serves to distribute the strains more uniformly and cause the nut to "clench" harder upon the body. When applied to a wood body the rib being spaced from the bolt, would cause the bolt to be maintained more steadily in position. The jam nut 20 is then arranged upon the reduced threaded portion 17 and rotated to bring one of the grooves 21 into position, to receive the locking element. All of the outer open ends of the grooves except one are then closed by inserting therein a small quantity of putty, clay, or like material, and then inserting into the open grooves a quantity of material such as melted lead, or like metal or compound, which passes into the cavity 19 and surrounds the portion of the bolt which passes through the cavity, the material likewise passing into the portions of the grooves 21 not occupied by the putty or clay and likewise through the recess 22. As before stated the cavity 19 is of sufficient depth to cause one or more of the threads 15 to be disposed within the cavity, and when the securing material is thus passed into the cavity it passes around these exposed threads and likewise around the reduced portion 16 and likewise around the exposed threads of the portion 17. The recess 19 will be formed either square as shown in Fig. 4, or polygonal as shown in Fig. 7, so that the material forms an effectual lock between the nuts and the bolt.

While melted lead is noted as a suitable material to be employed as a locking means between the bolt and nut, any other material compound or substance which will accomplish the same results may be used. For instance "shredded" lead may be employed as a locking medium instead of melted lead, as will be obvious.

With a device thus constructed it will be obvious that the nuts are firmly and effectually secured upon the bolt and prevented from rotary movement in either direction. The nuts will thus be effectually prevented from becoming loosened no matter how severely the bodies 13—14 and the bolt may be subjected to jars and concussions.

When employed in connection with some structures the jam nut 20 may not be required, and in that event the ductile material will be inserted in the recess 19 only, and engage with the exposed threads 15 and the reduced portion 16. The ductile element will thus effectually lock the nut in position upon the bolt, but the nut thus secured will not offer as firm a resistance to retrograde movement as when the jam nut is employed.

The improved device is simple in construction, can be inexpensively manufactured, and applied to bolts and nuts of various sizes and employed for various purposes, as before stated.

What is claimed, is:—

1. In a nut lock a bolt having a main threaded portion near one end with a projection having irregular outer surfaces in advance of the main threaded portion and an outer threaded portion in advance of the irregularly surfaced portion, a nut engaging said main threaded portion with a recess in its outer face in advance of the threaded aperture thereof with a part of the main threaded portion of the bolt and the irregular portion extending into the recess, a jam nut engaging the outer threaded portion, and a locking device consisting of a metallic element fusible at a lower temperature than the material of the nut and the bolt and inserted while fused into the recess and around the portion of the bolt within the same.

2. In a nut lock, a bolt having a threaded portion near one end and with a projection having irregular outer surfaces in advance of the threaded portion and a reduced threaded portion in advance of the irregularly surfaced portion, a nut engaging said threaded portion with a recess in its outer face surrounding the inner aperture thereof with a part of the threaded portion of the bolt and the irregular portion extending into the recess, a jam nut engaging the reduced threaded portion and provided with radial grooves in its inner face, and a locking device consisting of a metallic element fusible at a lower temperature than the material of the nut and bolt and inserted while fused into the recess and the grooves of the jam nut and around the portion of the bolt within the recess.

3. In a nut lock, a bolt having a threaded portion near one end and with a projection having irregular outer surfaces in advance of the threaded portion and a reduced threaded portion in advance of the irregularly surfaced portion, a nut engaging said threaded portion with a recess in its outer face surrounding the inner aperture thereof with a part of the threaded portion of the bolt and the irregular portion extending into the recess, a jam nut engaging the reduced threaded portion and provided with radial grooves in its inner face, and a locking device consisting of a ductile element compressible into the recess and the grooves of the jam nut and around the portion of the bolt within the recess.

In testimony whereof, I affix my signature, in presence of two witnesses.

JOHN C. CROWSON.

Witnesses:
W. C. DEVLEN,
J. T. MACKEY.